HOWARD P. CLARK
KENNETH S. BARNHILL, JR.
MARTIN WILSON
INVENTORS.

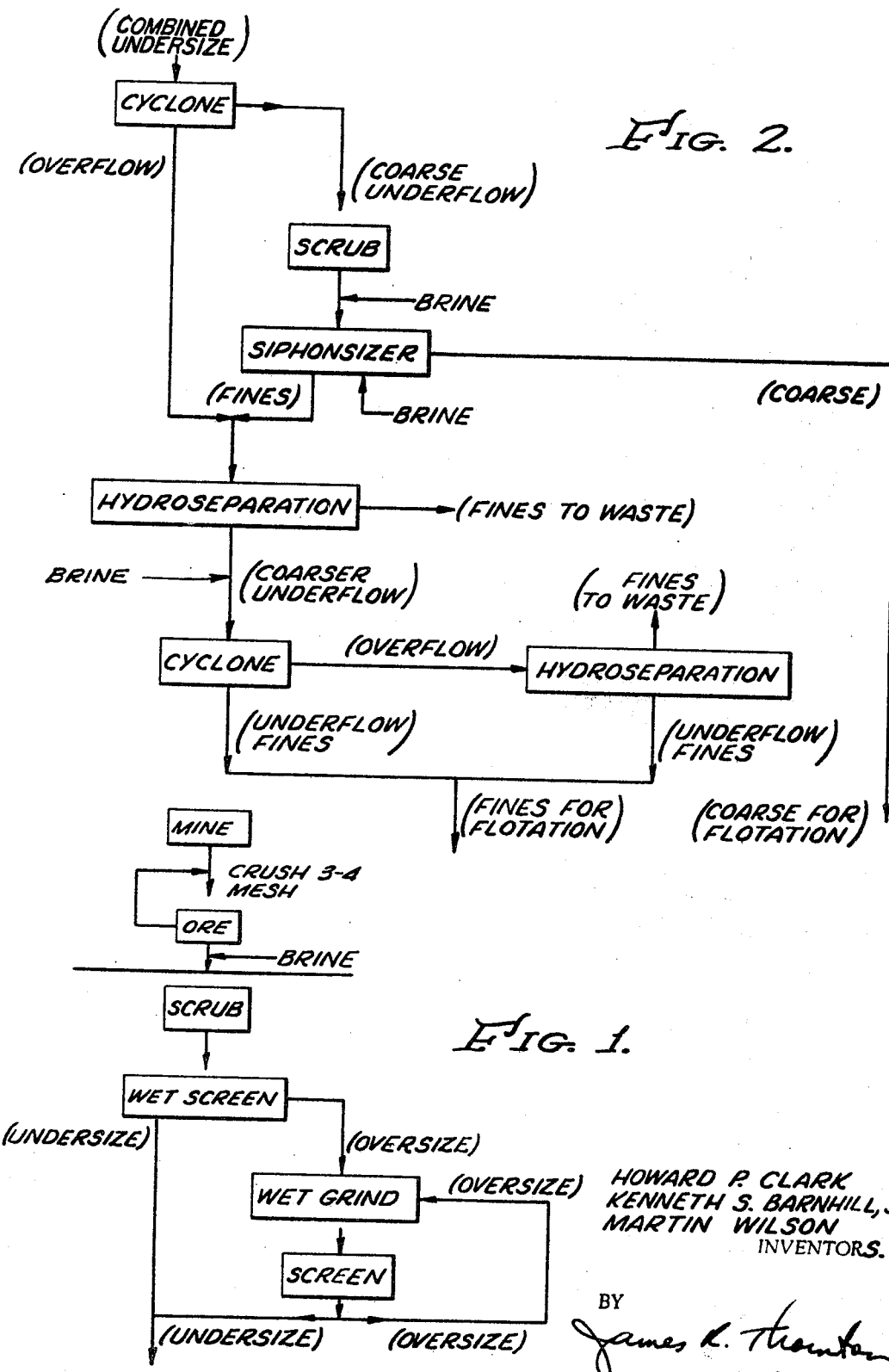

BY

James R. Thornton

AGENT.

HOWARD P. CLARK
KENNETH S. BARNHILL, JR.
MARTIN WILSON
INVENTORS.

United States Patent Office 3,446,443
Patented May 27, 1969

3,446,443
PROCESS FOR RECOVERING POTASH VALUES
Howard P. Clark, Littleton, Colo, Kenneth S. Barnhill, Jr., Saskatoon, Saskatchewan, Canada, and Martin Wilson, Anaheim, Calif., assignors to United States Borax & Chemical Corporation, Los Angeles, Calif., a corporation of Nevada
Filed Dec. 8, 1965, Ser. No. 512,304
Int. Cl. B02c 1/00
U.S. Cl. 241—20                              9 Claims

ABSTRACT OF THE DISCLOSURE

Improved procedure for preparing potash ore for froth flotation, froth flotation procedures and recovery of high content $K_2O$ product from potash ore.

Figure 3:
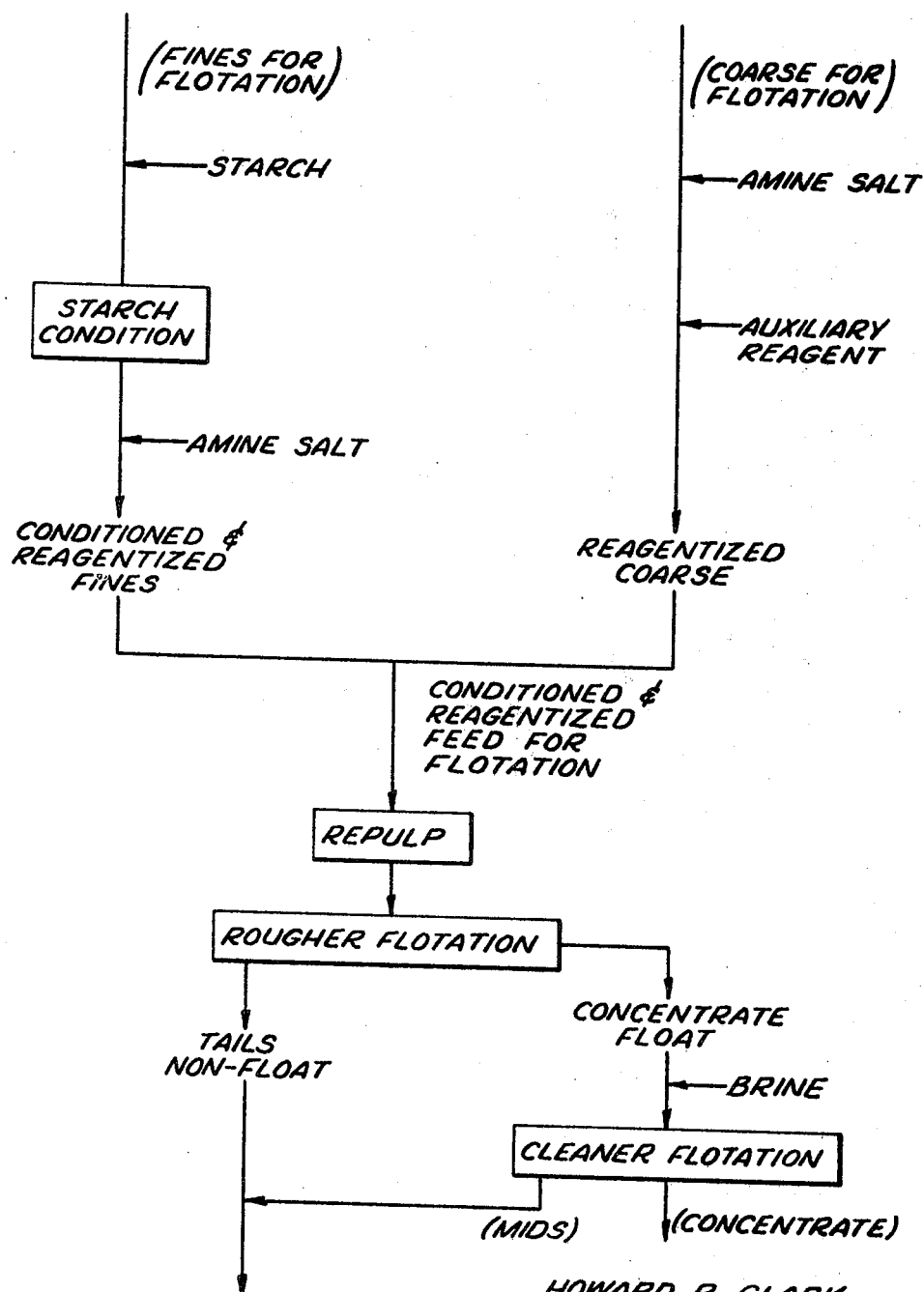

This invention relates to a procedure for recovering potash values from potash ore. It includes within its ambit: an improved procedure for reducing potash ore to a size suitable for froth flotation; an improved procedure for preparing sized potash ore for flotation; an improved froth flotation procedure for recovering potash values from potash ore; an improved procedure for extracting potash values from froth flotation product; an improved procedure for recovering reusable brine from a discarded float product; and a procedure for recovering potash values from a wet potash filter cake.

Froth flotation of potash from potash ores such as sylvinite, which is predominantly potasisum chloride and sodium chloride, is generally accomplished by crushing the ore to the point of KCl-NaCl liberation, treating the ore to remove insoluble clays, reagentizing the treated ore with flotation reagents which have an affinity for potash, and finally separating the KCl from the NaCl in a conventional rougher-cleaner flotation circuit.

In many procedures contemplated heretofore, steps were carried out in the interests of attempting to effect improvements in individual stages of the potash value recovery steps. However, the present invention resides basically in the provision of a unified procedure involving an overall improved process which is a simple economical procedure. Also, as a result of this unified concept, individual improvements have also been taught which combine additively to provide an overall improved unified procedure.

By one aspect of the present invention there is now provided a procedure for recovering potash values from potash ore which comprises the steps: comminuting said ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; and continuously returning said second oversize fraction to said wet comminution step in a closed loop cycle; whereby only undersize ore for flotation is recovered; separating said undersize ore to provide a coarser portion and a finer portion, reagentizing both portions of said potash ore, submitting said reagentized ore to froth flotation, separating the potash concentrate from said froth flotation and removing water from said potash concentrate to give potash having a high $K_2O$ value.

By another aspect of this invention, there is provided in a procedure for preparing potash ore for flotation including the steps of: effecting a first size separation of particles in a brine slurry to provide a first fine overflow fraction and a first coarse underflow fraction; subjecting the first coarse underflow fraction in a brine slurry to a size separation in a siphonsizer to provide a final coarser fraction and a second finer fraction; combining said finer fractions; and subjecting said combined finer fractions in a brine slurry to a size separation to provide a discardable finer fraction, and a recoverable coarse fraction. As an additional improvement in the aforedefined aspect, there is provided the steps of: subjecting said recoverable coarse fraction in a brine slurry to a size separation to provide a first final finer fraction and a fourth finer fraction; subjecting said fourth finer fraction to another size separation in a brine slurry to provide a discardable finer fraction, and a second final finer fraction; and combining said final finer fractions.

By still another aspect of this invention there is provided, in a froth flotation procedure for the recovery of potash values from potash ore, the steps which include: subjecting a reagentized slurry of finer and coarser fractions of potash ore to a rougher flotation to provide a first non-float tails product and a first float concentrate product; subjecting said first float concentrate product to a cleaner flotation to provide a second float concentrate recovered product and a first non-float middlings product; combining said first non-float tails product with said first non-float middlings fraction; subjecting said combined fraction to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction and subjecting said second float concentrate product to a regrind cleaner flotation to provide a recovered third concentrate float product and a second non-float middlings product.

By a further aspect of this invention there is provided in a process for recovering potash values from a float concentrate product including the steps of: subjecting a float concentrate product to a size classifying step to provide a first finer fraction and a first coarser fraction; subjecting said first coarser fraction to a leaching step; combining said leached product with said first finer fraction and with a further flotation float product; subjecting said added product to a first procedure to separate liquids from solids; recovering the solid product; subjecting the effluent from said first liquids-solids separation procedure to a thickening step to provide a solids fraction and a liquid fraction; subjecting said solids fraction to a second procedure to separate liquids from solids; recovering the solids product; and recycling the liquid effluent in a closed cycle to said thickening step.

By a still further aspect of this invention, there is provided in a procedure for recovering useful brine from a discardable flotation product which process includes the steps of: subjecting said product to at least one size separation step to provide a first underflow fraction and a first overflow fraction; subjecting said first underflow fraction to a first procedure to separate solids from liquids to provide a first solids fraction and a first liquid fraction; discarding said solid fraction; combining said first overflow fraction with said first liquid fraction; subjecting said combined fractions to a thickening step to provide a first recovered brine fraction and a second solids fraction; subjecting said second solids fraction to a second procedure to separate solids from liquids to provide a third solids fraction and a third liquid fraction; discarding said solids fraction; and returning said third liquid fraction, in a closed loop system, to said thickening step.

According to an additional aspect of this invention there is provided a procedure for recovering potash values from a wet potash filter cake which comprises: combining a first potash filter cake with at least a portion of a second potash filter cake; drying said combined filter cake; subjecting said dried filter cakes to a size separation procedure to provide a plurality of coarser fractions and a finer fraction; subjecting a portion of said finer fraction to a compaction procedure; comminuting said copacted fines; adding the entire said comminuted fraction to said dried filter cake prior to said size separation procedure, in a closed loop circuit; and dissolving the residual portion of said fines fraction and the residual portion of said second potash filter cake in a mother liquor from which is recovered a first recovered brine portion.

By yet another aspect of this invention there is provided a procedure including: comminuting sylvinite ore; slurrying said ore with brine; wet classifying said ore to provide a first undersized fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; continuously returning said second oversize fraction to said wet comminution step in a closed loop cycle; whereby only undersize ore for flotation is recovered; subjecting said undersize ore to a first size separation of particles in a brine slurry to provide a first fines overflow fraction and a first coarse underflow fraction; subjecting the first coarse underflow fraction in a brine slurry to a size separation to provide a final coarser fraction and a second finer fraction; combining said finer fractions; and subjecting said combined finer fractions in a brine slurry to a size separation to provide a discardable finer fraction and a recoverable coarse fraction. In addition, this aspect includes the addition steps of subjecting said recoverable coarse fraction in a brine slurry to a size separation to provide a first final finer fraction and a further fines fraction; subjecting said further fines fraction to another size separation in a brine slurry to provide a discardable fines fraction, and a second final finer fraction; and combining said final finer fractions.

By yet another aspect of this invention there is provided a procedure including the steps of: conditioning a finer fraction of potash ore; reagentizing said conditioned finer fraction; separately reagentizing a coarser fraction of said potash ore; combining said separately conditioned finer and coarser fractions to provide a conditioned and reagentized feed for flotation; subjecting said conditioned and reagentized feed slurry of finer and coarser fraction of potash ore to rougher flotation to provide a first non-float tails product and a first float concentrate product; subjecting said first float concentrate product to a cleaner flotation to provide a second float concentrate recovered product and a first non-float middlings product; combining said first non-float tails product with said first non-float middlings fraction; subjecting said combined fractions to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction; and subjecting said second float concentrate product to a regrind cleaner flotation to provide a recovered third concentrate float product and a second non-float middlings product.

By yet another aspect of this invention there is provided a procedure including: comminuting sylvinite ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; continuously returning said second oversize fraction to said wet comminution step in a closed loop cycle; whereby only undersize ore for flotation is recovered; subjecting said undersize ore to a first size separation of particles in a brine slurry to provide a first fines overflow fraction and a first coarse underflow fraction; subjecting the first coarse underflow fraction in a brine slurry to a size separation to provide a final coarser fraction and a second finer fraction; combining said finer fraction; subjecting said combined finer fractions in a brine slurry to a size separation to provide a discardable finer fraction and a recoverable coarse fraction; separately conditioning a finer fraction of said potash ore; reagentizing said conditioned finer fraction; separately reagentizing a coarser fraction of said potash ore; combining said separately conditioned finer and coarser fractions to provide a conditioned and reagentized feed for flotation; subjecting said conditioned and reagentized feed slurry of finer and coarser fraction of potash ore to rougher flotation to provide a first non-float tails product and a first float concentrate product subjecting said first float concentrate product to a cleaner flotation to provide a second float concentrate recovered product and a first non-float middlings product; combining said first non-float tails product with said first non-float middlings fraction; subjecting said combined fractions to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction; and subjecting said second float concentrate product to a regrind cleaner flotation to provide a recovered third concentrate float product and a second non-float middlings product.

By yet another aspect of this invention there is provided a procedure including comminuting sylvinite ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; and continuously returning said second oversize fraction to said wet comminution step in a closed loop cycle; whereby only undersize ore for flotation is recovered; subjecting said undersize ore to a first size separation of particles in a brine slurry to provide a first finer overflow fraction and a first coarse underflow fraction; subjecting the first coarse underflow fraction in a brine slurry to a size separation to provide a final coarser fraction and a second finer fraction; combining said finer fractions; and subjecting said combined finer fractions in a brine slurry to a size separation to provide a discardable finer fraction, and a recoverable coarse fraction. In addition, this aspect includes the addition steps of; subjecting said recoverable coarse fraction in a brine slurry to a size separation to provide a first final finer fraction and a further finer fraction; subjecting said further finer fraction to another size separation in a brine slurry to provide a discardable finer fraction, and a second final finer fraction; combining said final finer fractions; separately conditioning a finer fraction of said potash ore; reagentizing said conditioned finer fraction; separately reagentizing a coarser fraction of said potash ore; and combining said separately conditioned finer and coarser fractions to provide a conditioned and reagentized feed for flotation; subjecting said conditioned and reagentized feed slurry of finer and coarser fraction of potash ore to rougher flotation to provide a first non-float tails product and a first float concentrate product; subjecting said first float concentrate product to a cleaner flotation to provide a second float concentrate recovered product and a first non-float middlings product; combining said first non-float tails product with said first non-float middlings fraction; subjecting said combined fractions to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction; and subjecting said second float concentrate product to a regrind cleaner flotation to provide a recovered third concentrate float product and a second non-float middlings product.

In another aspect of this invention, there is provided a procedure which includes the steps of: subjecting a reagentized slurry of finer and coarser fraction of potash ore to rougher flotation to provide a first non-float tails product and a first float concentrate product; subjecting said first float concentrate product to a cleaner flotation to provide a second float concentrate recovered product and a first non-float middlings product; combining said first non-float tails product with said first non-float middlings fraction; subjecting said combined fractions to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction; subjecting said second float concentrate product to a regrind cleaner flotation to provide a recovered third concentrate float product and a second non-float middlings product subjecting said first float concentrate product to a size classification step to provide a first finer fraction and a first coarser fraction; subjecting said first coarser fraction to a leaching step; combining said leached product with said first finer fraction; adding said combined fraction to said third concentrate float product; subjecting said added product to a first procedure to separate liquids from solids; recovering the solid product, subjecting the effluent from said first liquid-solids separation procedure to a thickening procedure to a thickening step to provide a solids fraction and a liquid fraction; subjecting said solids fraction to a second procedure to separate liquids from solids; recovering the solids product; recycling the liquid effluent in a closed cycle to said thickening step; combining said first undersized fraction, said second tails non-float product and said second middlings non-float product to form a third flotation tails product; subjecting said third flotation tails product to at least one size separation step to provide a first underflow fraction and a first overflow fraction; subjecting said first underflow fraction to a first procedure to separate solids from liquids to provide a first solids fraction and a first liquid fraction; discarding said first solids fraction; combining said first overflow fraction with said first liquid fraction; subjecting said combined fractions to a thickening step to provide a first recovered brine fraction and a second solids fraction; subjecting said second solids fraction to a second procedure to separate solids from liquids to provide a third solids fraction and a third liquid fraction; discarding said third solids fraction; and returning said third liquid fraction; in a close loop system, to said thickening step.

By yet another aspect of this invention, there is provided a procedure including comminuting sylvinite ore, slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; continuously returning said second oversize fraction to said wet comminution step in a closed loop cycle; whereby only undersize ore for flotation is recovered; subjecting said undersize ore to a first size separation of particles on a brine slurry to provide a first finer overflow fraction and a first coarse underflow fraction; subjecting the first coarse underflow fraction in a brine slurry to a size separation to provide a final coarser fraction and a second finer fraction; combining said finer fractions; subjecting said combined finer fractions in a brine slurry to a size separation to provide a discardable finer fraction, and a recoverable coarse fraction; separately conditioning a finer fraction of said potash ore; reagentizing said conditioned finer fraction; separately reagentizing a coarser fraction of said potash ore; combining said separately conditioned finer and coarser fractions to provide a conditioned and reagentized feed for flotation; subjecting said conditioned and reagentized feed slurry of finer and coarser fractions of potash ore to a rougher flotation to provide a first non-float tails product and a first float concentrate product; subjecting said first float concentrate product to a cleaner flotation to provide a second float concentrate recovered product and a first non-float middlings product; combining said first non-float tails product with said first non-float middlings fraction; subjecting said combined fraction to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction; subjecting said second float concentrate product to a regrind cleaner flotation to provide a recovered third concentrate float product and a second non-float middlings product; subjecting said first float concentrate product to a size classification step to provide a further finer fraction and a further coarser fraction; subjecting said further coarser fraction to a leaching step; combining said leached product with said further finer fraction; adding said combined fractions to said third concentrate float product; subjecting said added product to a first procedure to separate liquids from solids; recovering the solid product; subjecting the effluent from said first liquid-solids separation procedure to a thickening step to provide a solids fraction and a liquid fraction; subjecting said solids fraction to a second procedure to separate liquids from solids; recovering the solids product; and recycling the liquid effluent in a closed cycle to said thickening step.

By yet another aspect of this invention there is provided a procedure including; comminuting sylvinite ore; slurrying said ore with brine; wet classifying said ore to provide a first undersize fraction and a first oversize fraction; comminuting said first oversize fraction in a wet comminuting step; wet classifying said comminuted first oversize fraction to provide a second undersize fraction and a second oversize fraction; combining said second undersize fraction with said first undersize fraction; continuously returning said second oversize fraction to said wet comminution step in a closed loop cycle; whereby only undersize ore for flotation is recovered; subjecting said undersize ore to a first size separation of particles in a brine slurry to provide a first finer overflow fraction and a first coarse underflow fraction; subjecting the first coarse underflow fraction in a brine slurry to a size separation to provide a final coarser fraction and a second finer fraction; combining said finer fraction; subjecting said combined finer fractions in a brine slurry to a size separation to provide a discardable finer fraction, and a recoverable coarse fraction; subjecting said recoverable coarse fraction in a brine slurry to a size separation to provide a first final finer fraction and a further finer fraction; subjecting said further finer fraction to another size separation in a brine slurry to provide a discardable finer fraction and a second final finer fraction; and combining said final finer fraction; separately conditioning said final finer fractions of said potash ore; reagentizing said conditioned finer fractions; separately reagentizing a coarser fraction of said potash ore; combining said separately conditioned finer and coarser fractions to provide a conditioned and reagentized feed for flotation; subjecting said conditioned and reagentized fee slurry of finer and coarser fraction of potash ore to a rougher flotation to provide a first non-float tails product and a first float concentrate product; subjecting said first float concentrate product to a cleaner flotation to provide a second float concentrate recovered product and a first non-float middlings product; combining said first non-float tails product with said first non-float middlings fraction; subjecting said combined fraction to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction; subjecting said second float concentrate product to a regrind cleaner flotation to provide a recovered third concentrate float product and a second non-float middlings product; subjecting said first float concentrate product to a size classification step to provide a first finer fraction and a first coarser fraction; subjecting said first coarser fraction to a leaching step, combining said leached product with said first finer fraction; adding said combined fraction to said third concentrate float product; subjecting said added product to a first procedure to separate liquids from solids; recovering the solid product; subjecting the effluent from said first liquid-solids separation procedure to a thickening step to provide a solids fraction and a liquid fraction; subjecting said solids fraction to a second procedure to separate liquids from solids; recovering the solids product; recycling the liquid effluent in a closed cycle to said thickening step; combining said first undersize fraction, said second tails non-float product and said second middlings non-float product to form a third flotation tails; subjecting said third flotation tails to at least one size separation step to provide a first underflow fraction and a first overflow fraction; subjecting said first underflow fraction to a first procedure to separate solids from liquids to provide a first solid fraction and a first liquid fraction; discarding said solid fraction; combining said first overflow fraction with said first liquid fraction; subjecting said first combined fractions to a thickening step to provide a first recovered brine fraction and a second solids fraction; subjecting said second solids fraction to a second procedure to separate solids from liquids to provide a third solids fraction and a third liquid fraction; and returning said third liquid fraction, in a closed loop system, to said thickening step.

By yet another aspect of this invention there is provided a procedure including: comminuting sylvinite ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; continuously returning said second oversize fraction to said wet comminution step in a closed loop cycle; whereby only undersize ore for flotation is recovered; subjecting said undersize ore to a first size separation of particles in a brine slurry to provide a first finer overflow fraction and a first coarse underflow fraction; subjecting the first coarse underflow fraction in a brine slurry to a size separation to provide a final coarser fraction and a second finer fraction; combining said finer fractions; subjecting said combined finer fractions in a brine slurry to a size separation to provide a discardable finer fraction, and recoverable coarse fraction; separately conditioning said recovered finer fraction of said potash ore; reagentizing said conditioned finer fraction; separately reagentizing said recovered coarser fraction of said potash ore; combining said separately conditioned finer and coarser fractions to provide a conditioned and reagentized feed for flotation; subjecting said conditioned and reagentized feed slurry of finer and coarser fractions of potash ore to a rougher flotation to provide a first non-float tails product and a first float concentrate product; subjecting said first float concentrate product to a cleaner flotation to provide a second float concentrate recovered product and a first non-float middlings product; combining said first non-float tails product with said first non-float middlings fraction; subjecting said combined fractions to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction; subjecting said second float concentrate product to a regrind cleaner flotation to provide a recovered third concentrate float product and a second non-float middlings product; subjecting said first float concentrate product to a size classification step to provide a first finer fraction and a first coarser fraction; subjecting said first coarser fraction to a leaching step; combining said leached product with said first finer fraction; adding said combined fraction to said third concentrate float product; subjecting said added product to a first procedure to separate liquids from solids; recovering the solid product; subjecting the effluent from said first liquid-solids separation procedure to a thickening step to provide a solids fraction and a liquid fraction; subjecting said solids fraction to a second procedure to separate liquids from solids; recovering the solids product recycling the liquid effluent in a close cycle to said thickening step; combining said first undersize fraction, said second tails non-float product and second middlings non-float product to form a third flotation tails; subjecting said third flotation tails to at least one size separation step to provide a first underflow fraction and a first overflow fraction; subjecting said first underflow fraction to a first procedure to separate solids from liquids to provide a first solid fraction and a first liquid fraction; discarding said solids fraction; combining said first overflow fraction with said first liquid fraction; subjecting said first combined fractions to a thickening step to provide a first recovered brine fraction and a second solids fraction; subjecting said second solids fraction to a second procedure to separate solids from liquids to provide a third solids fraction and a third liquid fraction; discarding said solids fraction; and returning said third liquid fraction in a closed loop system, to said thickening step, combining first said float concentrate product as a first potash filter cake with at least a portion of said second float concentrate product as a second potash filter cake; drying said combined filter cakes; subjecting said dried filter cakes to a size separation procedure to provide a plurality of recovered coarser fractions and a finer fraction; subjecting a portion of said finer fraction to a compaction procedure; comminuting said compacted finer fraction; adding the entire said comminuted fraction to said dried filter cake prior to said size separation procedure, in a closed loop circuit; and dissolving the residual portion of said finer fraction and the residual portion of said second potash filter cake in a mother liquor from which is recovered a first recovered brine portion.

By yet another aspect of this invention there is provided a procedure including comminuting sylvinite ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; continuously returning said second oversize fraction to said wet comminution step in a closed loop cycle; whereby only undersize ore for flotation is recovered; subjecting said undersize ore to a first size separation of particles in a brine slurry to provide a first finer overflow fraction and a first coarse underflow fraction; subjecting the first coarse underflow fraction in a brine slurry to a size separation to provide a final coarser fraction and a second finer fraction; combining said finer fractions; subjecting said combined finer fractions in a brine slurry to a size separation to provide a discardable finer fraction, and a recoverable coarse fraction; subjecting said recoverable coarse fraction in a brine slurry to a size separation to provide a first final finer fraction and a further finer fraction; subjecting said further finer fraction to another size separation in a brine slurry to provide a discardable finer fraction, and a second final finer fraction; and combining said final finer fractions: separately conditioning said combined final finer fraction of said potash ore; reagentizing said conditioned finer fractions; separately reagentizing a coarser fraction of said potash ore; combining said separately conditioned finer and coarser fractions to provide a conditioned and reagentized feed for flotation; subjecting said conditioned and reagentized feed slurry of finer and coarser fractions of potash ore to a rougher flotation to provide a first non-float tails product and a first float concentrate product; subjecting said first float concentrate product to a cleaner flotation to provide a second float concentrate recovered product and a first non-float middlings product; combining said first non-float tails product with said first non-float middlings fraction; subjecting said combined fractions to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction; subjecting said second float concentrate product to a regrind cleaner flotation to provide a recovered third concentrate float product and a second non-float middlings product; subjecting said first float concentrate product to a size classification step to provide a first finer fraction and a first coarser fraction; subjecting said first coarser fraction to a leaching step; combining said leached product with said first finer fraction; adding said combined portion to said third concentrate float product; subjecting said added product to a first procedure to separate liquids from solids; recovering the solid product; subjecting the effluent from said first liquid-solids separation procedure to a thickening step to provide a solids fraction and a liquid fraction; subjecting said solids fraction to a second procedure to separate liquids from solids; recovering the solids product; recycling the liquid effluent in a closed cycle to said thickening step; combining said first undersize fraction, said second tails non-float product and said second middlings non-float product to form a third flotation tails; subjecting said third flotation tails to at least one size separation step to provide a first underflow fraction and a first overflow fraction; subjecting said first underflow fraction to a first procedure to separate solids from liquids to provide a first solid fraction and a first liquid fraction discarding said solid fraction; combining said first overflow fraction with said first liquid fraction; subjecting said first combined fractions to a thickening step to provide a first recovered brine fraction and a second solids fraction; subjecting said second solids fraction to a second procedure to separate solids from liquids to provide a third solids fraction and a third liquid fraction; discarding said solids fraction; returning said third liquid fraction; in a closed loop system, to said thickening step; combining said first concentrate product as a first potash filter cake with at least a portion of said second concentrate product as a second potash filter cake; drying said combined filter cakes; subjecting said dried filter cakes to a size separation procedure to provide a plurality of recovered coarser fractions and a finer fraction; subjecting a portion of said finer fraction to a compaction procedure; comminuting said compacted finer; adding the entire said comminuted portion to said dried filter cake prior to said size separation procedure; in a closed loop circuit; and dissolving the residual portion of said finer fraction and the residual portion of said second potash filter cake to form a first recovered brine portion.

In preparing the ore for the flotation procedure according to one aspect of this invention, it is comminuted, such as by use of conventional ore crushing equipment, to a particle size preferably in the range of about —8 to —10 mesh. The comminuted ore is then pulped by slurrying it in a saturated brine composed of the soluble constituents of the core. If the ore contains clay contaminants, it is preferred to deslime to remove the clay and fines. The deslimed feed is then split into coarser and finer fractions such as by screening through a screen or classifier. The mesh size at which the splitting takes place is not critical, it only being important that the ore is split into two fractions, one of which is coarser than the other.

After splitting, the fractions are reagentized separately and submitted to froth flotation circuits as described above. Conventional flotation temperatures, such as in the range of from about 15° to about 35° C. are employed.

If desired, a "binding" agent such as starch can be added to the finer portion prior to flotation to act as a depressant for the control of slimes.

The coarser and finer fractions are reagentized separately with the conventional amine flotation reagents well known to those skilled in the art. The saturated or unsaturated long-chain aliphatic amines, generally in the form of their water-soluble addition salts, can be used as collector reagents. Typical amines suitable as reagents are those having at least eight carbon atoms per molecule, such as n-octadecyl amine, n-octadecenyl amine, n-nonylamine, n-decylamine, preferably as the water soluble salts thereof such as the acetates, and the like. The amine collector reagents may be employed either individually or as a mixture containing more than one amine. The amine collector reagent may be employed in the form of an aqueous solution, emulsion, or solution in an organic solvent. In the floation of the finer portion, it is preferred to employ from about 0.05 to about 0.5 pound of the amine reagent per ton of ore. The coarser fraction is preferably reagentized with from about 0.2 to about 0.8 pound of the amine reagent per ton of ore. Of course, greater or lesser amounts of reagents can be used if desired, but the amounts above are presently preferred.

Also, to aid in the action of the amine collector reagents, it is preferred to employ auxiliary reagents such as alkylnaphthalenes, the chloro and hydrogenated derivatives thereof, alkylmercaptans, and dialkylsulfides and their aryl derivatives, dialkyl disulfides, dialkyl polysulfides, indane, alkylindanes and polycyclic aromatic compounds, or mixtures thereof, such as described in United States Patents 3,059,774 and 3,149,788, as well as co-pending United States patent application Ser. No. 397,036 filed Sept. 16, 1964, now U.S. Patent No. 3,341,135 by Martin Wilson and assigned to the assignee of the present application.

The polycyclic aromatic auxiliary reagents useful in this invention include those described and claimed in the aforesaid U.S. application Ser. No. 397,036 and have at least three rings in the molecule. These are high-boiling hydrocarbons, consisting mostly of the higher alkyl derivatives of condensed ring systems, which are obtainable as residues from the cracking of mineral oils. Many are known as reformate ends, cycle oils or products from cycle oils. They are generally characterized by a distillation range within about 500° to about 800° F., low pour points, such as below about 20° C., and relatively low viscosities, such as SSU of less than about 100 at 100° F. Usually such polycyclic aromatic oils occur as mixtures of condensed ring systems having 3 to about 5 rings and are predominantly tricyclic and tetracyclic hydrocarbon compounds, such as the acenaphthenes, fluorenes, phenanthrenes, pyrenes and benzonaphthenes. Such mixtures can also contain minor amounts of other lower ring systems such as alkylindanes, tetralins, and naphthelenes.

The amine collector reagents employed herein include those described and claimed in the aforesaid U.S. application Ser. No. 397,036, and those used by ore refiners in conventional flotation processes. The collector reagents are long chain aliphatic amines, saturated and unsaturated, having from about 7 to about 18 or more carbon atoms and are mostly commonly prepared from beef tallow. They are usually used as the salt of the amines, the most commonly used salt being the acetate, and they can be purchased commercially as mixed aliphatic amine acetates. The weight ratio of amine to polycyclic aromatic reagent is preferably about 1:1, although greater or lesser amounts can be employed and are desirable for some ores.

In a preferred embodiment of this invention there is employed as an auxiliary reagent, a combination of the above-described polycyclic aromatic reagents and at least one additional material selected from the group consisting of indane, the alkyl-indanes in which said alkyl substituents have from one to about eight carbon atoms, alkylnaphthalenes and the hydrogenated derivatives thereof, in which said alkyl substituents have from one to about eight carbon atoms. By employing said combination, an excellent recovery of very high grade ore is readily obtained. The combinations also retain the advantages of low pour point, low viscosities (preferably less than about 70 SSU at 100° F.) as well as relatively high volatility which results in oil-free ore concentrates after any drying procedure. A further advantage of the blends is the flexibility which can be obtained by varying the proportions of the components in order to adjust the auxiliary reagent to the possible changing characteristics of the ore (degree of liberation). However, a ratio of polycyclic aromatic to alkylindane or alkylnaphthalene of about 1:1 is normally employed.

The indanes, alkylindanes, alkylnaphthalenes, and their derivatives are described in U.S. Patent 3,059,774 and Canadian Patent No. 701,835. They can be employed as pure compounds, as mixtures of such compounds or as mixtures with related compounds. Whenever such mixtures are employed, the indanes, alkylindanes, alkylnaphthalenes, and their derivatives should be present in such amount as would provide the equivalent of the reagent as would be required in the flotation process if they were to be used in a substantially pure state.

The invention will be more fully understood with reference to the accompanying drawings in which FIGURES 1–7 are schematic representations of various stages of the process embodying the present invention.

Referring to FIG. 1, sylvinite ore as it is mined is crushed to a size in the range of 3–4 mesh. Oversize is recycled to the crusher. Undersize is scrubbed with an equilibrium brine solution, i.e. brine saturated with respect both to sodium chloride and potassium chloride.

The scrubbed ore is wet screened. Oversize is again wet ground and screened. The oversize is refed to the wet grind-wet screen cycle so that only undersize is recovered. That undersize is combined with the undersize from the first wet screening to provide ore particles of a size suitable for flotation. Only the mud should be removed first.

Moving to FIG. 2, the combined undersize from the preceding screening procedures containing about 10–25% solids is subjected to a cyclone sizing separation. The coarse underflow of solids content 40–70% is scrubbed with equilibrium brine and is fed at a solids content of about 10 to 40% to a siphonsizer. Here, a rough sizing separation takes place by settling against the upward flow of equilibrium brine. The coarse product from the siphonsizer is used as the coarse feed for flotation.

The fines from the siphonsizer, at a solids content of about 2 to 10%, is combined with the fines overflow from the cyclone, at a solids content of about 1 to 5% and is fed to a first hydroseparator. The fines overflowing the hydroseparator of a solids content of about 1 to 5% are led to waste. The coarser underflow, at a solids content of about 40 to 70%, is brought to a solids content of about 20 to 30% by the addition of equilibrium brine and is fed to a second cyclone separator. The overflow fines at a solids content of about 10 to 20% are fed to a second hydroseparator where overflow at a solids content of about 0.5 to 5% is led to waste. The underflow fines, at a solids content of about 40 to 70%, is combined with the underflow fines at a solids content of about 40 to 60% from the second cyclone. The combined fines are used as the fines for flotation.

Turning to FIG. 3, the fine fraction is mixed with a starch conditioner. The conditioned fines, at a solids content of about 40 to 65%, are then reagentized with an amine salt and optionally with an auxiliary reagent.

The coarse fraction is separately reagentized with an amine salt and an auxiliary reagent. The reagentized coarse, at a solids content of about 40 to 70%, is combined with the conditioned and reagentized fines to provide the feed for the flotation.

The feed for flotation is brought to a solids content of about 20 to 35% by the addition of equilibrium brine. The repulped feed is then subjected to flotation in the first rougher flotation, which consists of five banks of five cells each connected together in series. The concentrate, i.e. float product, of a solids content of about 25 to 35% is brought to a solids content of about 15 to 30% by the addition of overflow liquor from the effluent fines thickener, is fed to the first cleaner flotation which consists of five banks of four cells each connected together in series. The concentrate, i.e. float product, at a solids content of about 20 to 40%, is now termed "cleaner flotation concentrate."

Figure 5:
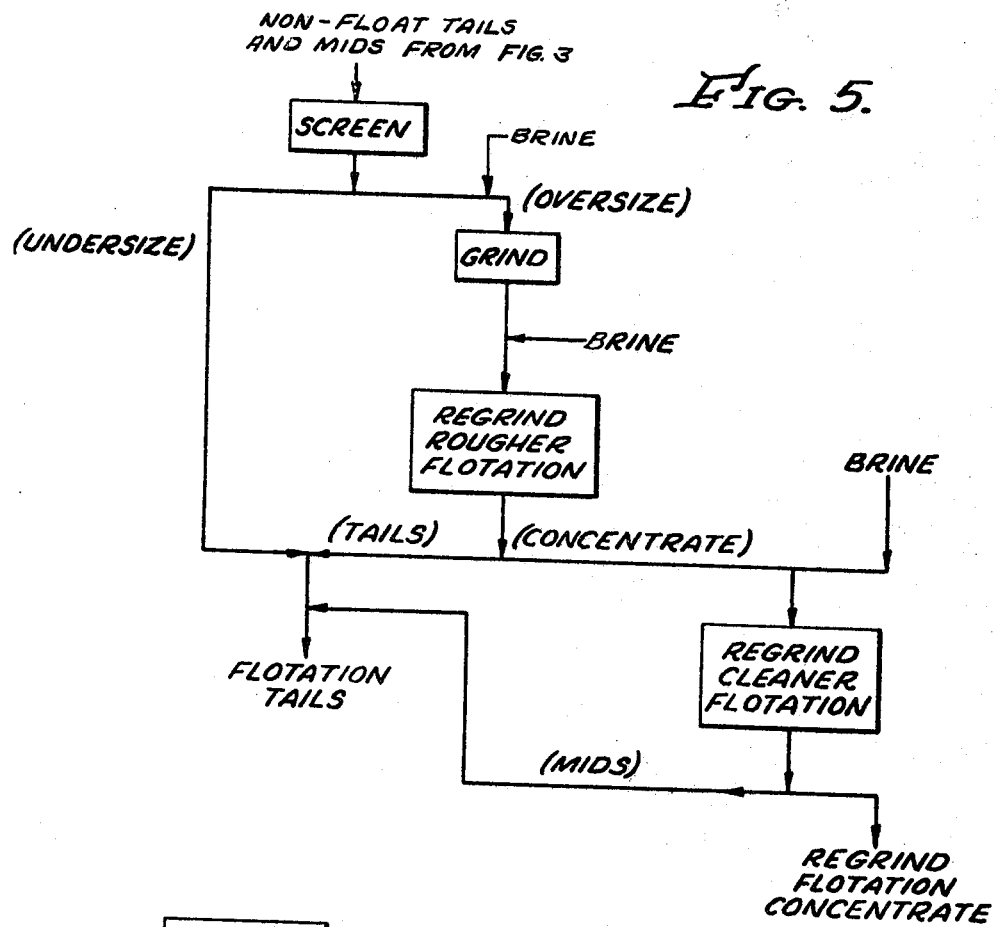

The tails, i.e. non-float, from the rougher flotation, at a solids content of about 15 to 30%, is combined with the middlings from the cleaner flotation, to give a solids content of about 10 to 25%, which is sent to a wet screen (see FIG. 5).

Figure 4:
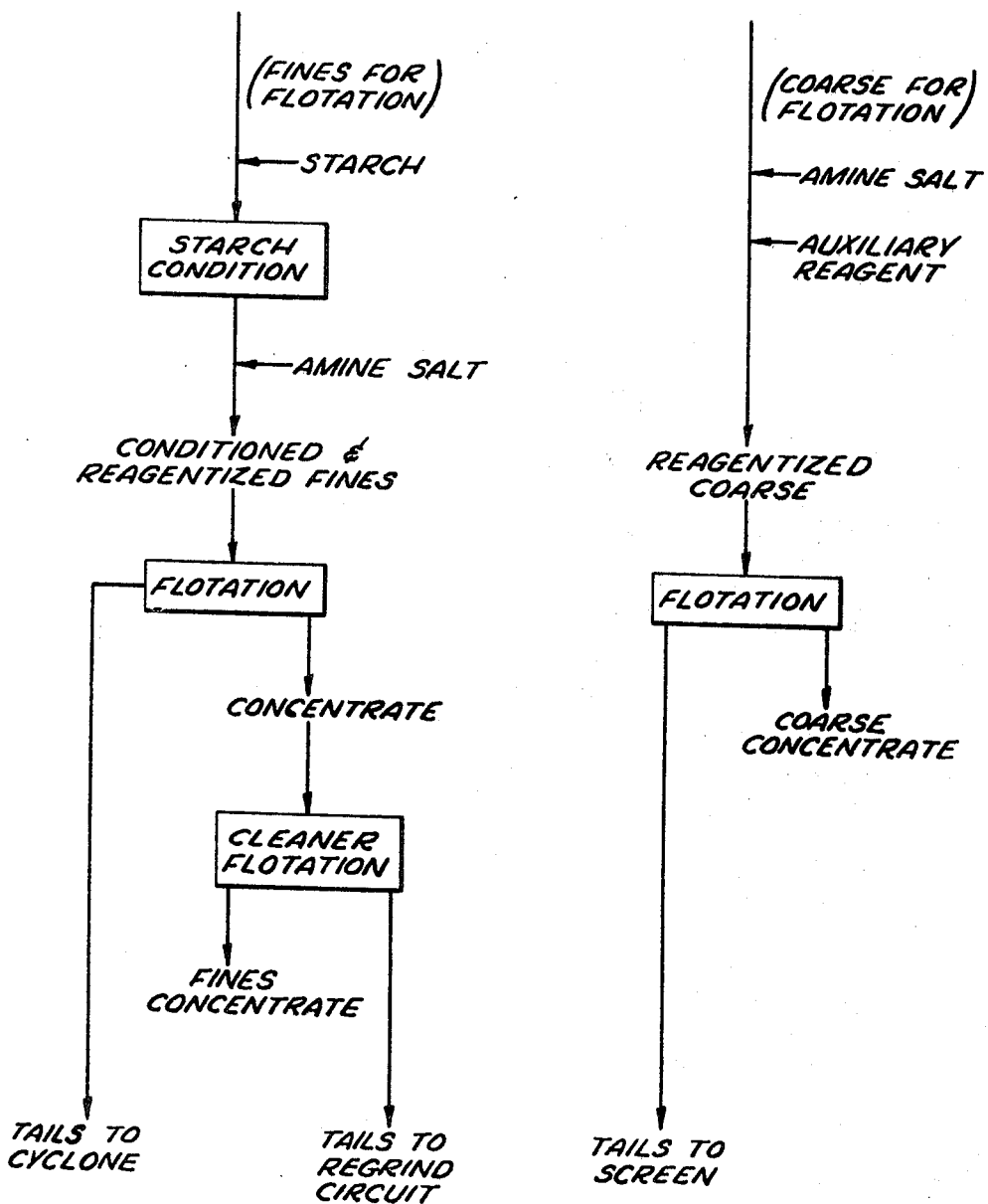
Figure 6:
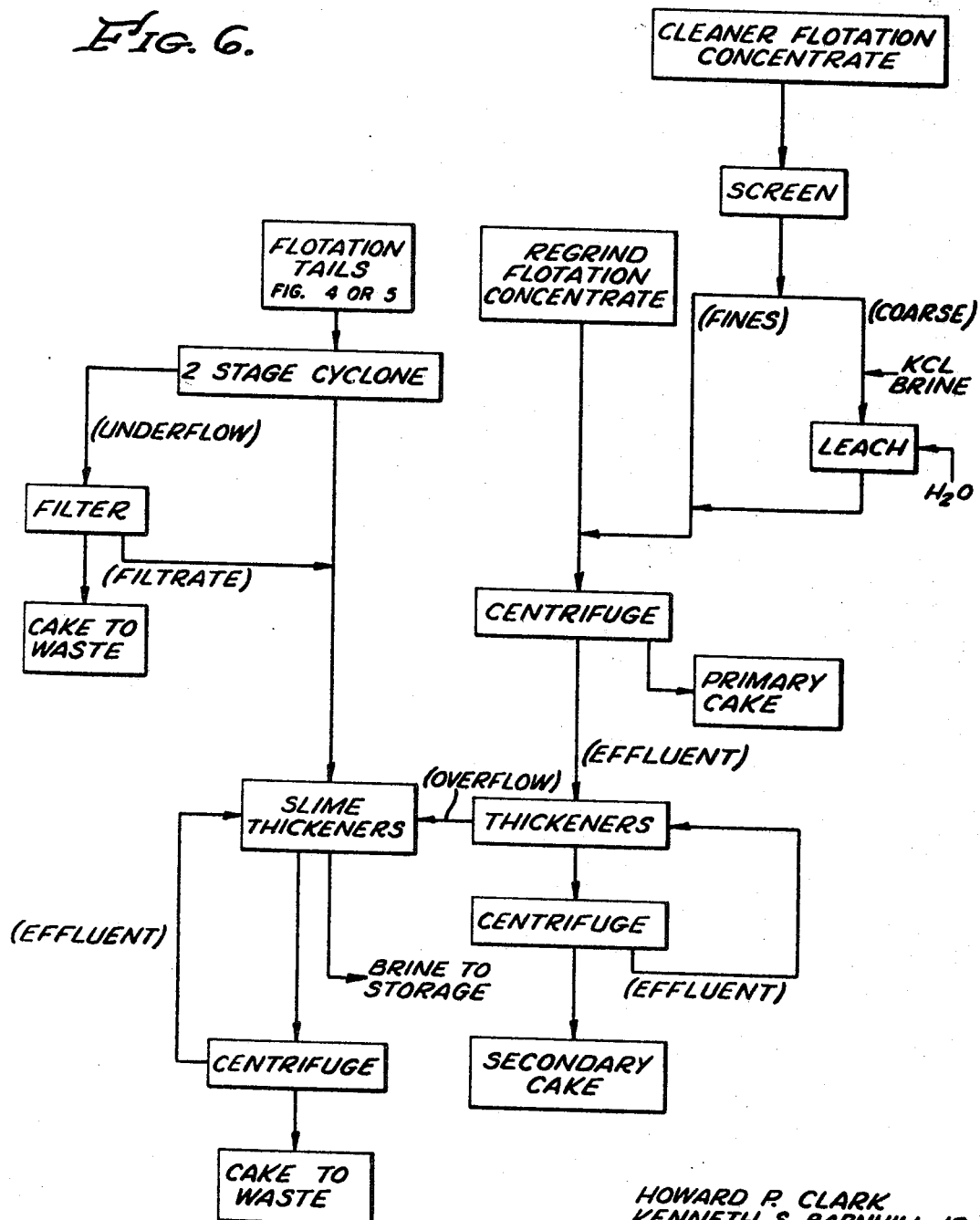

Alternatively, the fine and coarse potash ore can be subjected to separate flotation streams. Referring to FIG. 4, the fine fraction is mixed with a starch conditioner and the conditioned fines are then reagentized with an amine salt and optionally with an auxiliary reagent. The conditioned and reagentized fines are subjected to a first froth flotation and the concentrate, i.e. flotation product, is then subjected to a second cleaner flotation. The tails from the first flotation are discarded to waste or can be treated further in a second stage cyclone (FIG. 6). The tails from the second cleaner flotation are sent to the regrind circuit (FIG. 5) where they are injected with brine prior to the rougher flotation. The fine concentrate from the second cleaner flotation is centrifuged to provide primary cake (see FIG. 6).

In the coarse flotation stream the coarse fraction is reagentized with an amine salt and preferably with an auxiliary reagent and then submitted to a froth flotation procedure. The resultant concentrate is leached with KCl brine and centrifuged (FIG. 6) to provide primary cake and the tails are submitted to a screening procedure prior to regrind (FIG. 5).

In FIG. 5, the oversize from the wet screening, at a solids content of about 50 to 75%, is first brought to a solids content of about 40 to 60% by the addition of equilibrium brine, and is then wet ground in a rod mill. The effluent is brought to solids content of about 20 to 30% by the addition of equilibrium brine, and is then subjected to regrind rougher flotation, consisting of one bank of five rougher flotation cells connected together in series.

The concentrate, i.e., float product, at a solids content of about 20 to 40% is brought to a solids content of about 10 to 20% by the addition of equilibrium brine and is subjected to a regrind cleaner flotation, in a single bank of four cleaner flotation cells connected together in series. The concentrate at a solids content of about 20 to 35% is now termed "regrind flotation concentrate."

The middlings, of a solids content of about 1 to 6% from the regrind cleaner flotation are combined with the screened tails undersize at a solids content of about 8 to 15% to provide "flotation tails" of a solids content of about 5 to 13%.

Referring to FIG. 6, the flotation tails, at a solids content of about 5 to 15% is subjected to a two stage cyclone separation treatment. The underflow, at a solids content of about 40 to 70%, is then washed and simultaneously filtered. The filter cake, at a solids content of about 90%, is discarded to waste.

The filtrate is combined with the overflow from the two stage cyclone and with a portion of the overflow from the effluent fines thickener, and this combined feed, at a solids content of about 0.5 to 2.0%, is fed to a slimes thickener. The overflow from the slimes thickener is led to brine storage. The underflow is centrifuged and the centrifuge cake, at a solids content of about 60 to 80%, is discarded to waste. The centrifuge effluent is recycled to the slimes thickener.

The cleaner flotation concentrate at a solids content of about 20 to 40% is wet screened. The coarse from the screen, at a solids content of about 50 to 75%, is leached with a bleed of potassium chloride brine and water. The leach effluent, at a solids content of about 50 to 75% is combined with the screen fines, at a solids content of about 15 to 25%, to provide a mixed feed of solids content of about 25 to 35%. To this is added the "regrind flotation concentrate" at a solids content of about 15 to 30%. The combined concentrates, at a solids content of about 20 to 40%, is centrifuged. The cake from the centrifuge is termed "primary cake."

The effluent from the centrifuge, at a solids content of about 2 to 6%, is fed to an effluent fines thickener. The thickener overflow is fed to the slimes thickener and the thickener underflow, at a solids content of about 25 to 40%, is centrifuged. The centrifuge effluent, at a solids content of about 2 to 6%, is recycled to the thickener. The cake from the centrifuge is termed "secondary cake."

Figure 7:
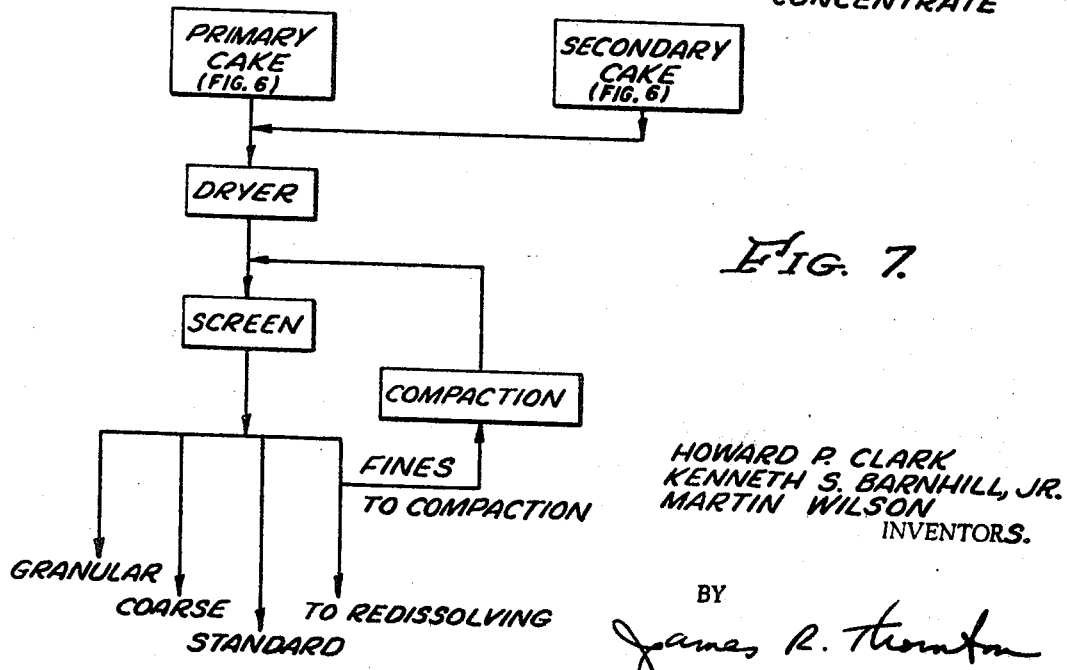

Referring to FIG. 7, the "primary cake" is dried in a dryer and is then dry screened on a pair of screens. The oversize from the first screen is classified into two sizes, i.e. granular product and coarse product. The oversize from the second screen forms the standard product. The screen fines are binned.

The binned product may either be redissolved in a white standard grade circuit, or it may be fed to a compaction cycle. In the compaction cycle, the fines are compacted, comminuted, and then screened in the two stage screen mentioned hereinabove.

The "secondary cake may either be redissolved in a white standard grade circuit, or may be fed to a dryer to be screened, etc. as described for the "primary cake."

Various changes and modifications of the invention can be made and, to the extent that such variations incoroprate the spirit of this invention, they are intended to be included within the scope of the appended claims.

We claim as our invention:

1. The process for recovering potash values from potash ore which comprises the steps: comminuting said ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; and continuously returning said second oversize fraction to said wet comminution step in a closed loop cycle; whereby only undersize ore for flotation is recovered; effecting a first size separation of said undersize ore particles in a brine slurry to provide a first finer overflow fraction and a first coarse underflow fraction; subjecting the first coarse underflow fraction in a brine slurry to a size separation in a siphonsizer to provide a final coarser fraction and a second finer fraction; combining said finer fractions; and subjecting said combined finer fractions in a brine slurry to a size separation to provide a discardable finer fraction, and a recoverable coarse fraction; reagentizing said final coarser fraction of said potash ore, submitting said reagentized ore to froth flotation, separating the potash concentrate from said froth flotation and removing water from said potash concentrate to give potash having a high $K_2O$ value.

2. The process according to claim 1 wherein said recoverable coarse fraction is subjected in a brine slurry to a size separation to provide a first final finer fraction and a further fines fraction; subjecting said further fines fraction to another size separation in a brine slurry to provide a discardable finer fraction, and a second final finer fraction; and combining said final finer fractions for reagentizing and froth flotation.

3. The process for recovering potash values from potash ore which comprises the steps: comminuting said ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; and continuously returning said second oversize fraction to said wet comminution step in a closed loop cycle; whereby only undersize ore for flotation is recovered; separating said undersize ore to provide a coarser fraction and a finer fraction, separately reagentizing said coarser fraction and submitting said reagentized coarser fraction to froth flotation to yield a clean potash concentrate; separately reagentizing said finer fraction, submitting said reagentized finer fraction to froth flotation to yield a rough concentrate, and then submitting said rough concentrate to a second froth flotation to give a clean potash concentrate; and removing water from said clean potash concentrates to give potash having a high $K_2O$ value.

4. The process for recovering potash values from potash ore which comprises the steps: comminuting said ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; and continuously returning said second oversize fraction to said wet comminution step in a closed loop cycle; whereby only undersize ore for flotation is recovered; separating said undersize ore to provide a coarser fraction and a finer fraction, conditioning said finer fraction of potash ore; reagentizing said conditioned finer fraction; separately reagentizing a coarser fraction of said potash ore; combining said separately conditioned finer and coarser fractions to provide a conditioned and reagentized feed for flotation; subjecting said conditioned and reagentized feed slurry of finer and coarser fraction of potash ore to rougher flotation to provide a first non-float tails product and a first float concentrate product; subjecting said first float concentrate product to a cleaner flotation to provide a second float concentrate recovered product and a first non-float middlings product; combining said first non-float tails product with said first non-float middlings fraction; subjecting said combined fractions to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction; and subjecting said second float concentrate product to a regrind cleaner flotation to provide a recovered third concentrate float product and a second non-float middlings product, and recovering K₂O from said third concentrate float product.

5. The process according to claim 4 in which said second float concentrate recovered product from said cleaner flotation is subjected to a size classifying step to provide a first finer fraction and a first coarser fraction; subjecting said first coarser fraction to a leaching step; combining said leached product with said first finer fraction and with said third concentrate float product of claim 4; subjecting the combined products to a first procedure to separate liquids from solids; recovering the solid product; subjecting the effluent from said first liquid-solids separation procedure to a thickening step to provide a solids fraction and a liquid fraction; subjecting said solids fraction to a second procedure to separate liquids from solids; recovering the solids product; and recycling the liquid effluent in a closed cycle to said thickening step.

6. The process for recovering potash values from sylvinite ore which comprises comminuting said ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; continuously returning said second oversize fraction to said wet comminution step in a closed loop cycle; whereby only undersize ore for flotation is recovered; subjecting said undersize ore to a first size separation of particles in a brine slurry to provide a first finer overflow fraction and a first coarse underflow fraction, subjecting the first coarse underflow fraction in a brine slurry to a size separation to provide a final coarser fraction and a second finer fraction; combining said finer fractions; subjecting said combined finer fractions in a brine slurry to a size separation to provide a discardable finer fraction, and a recoverable coarse fraction; subjecting said recoverable coarse fraction in a brine slurry to a size separation to provide a first final finer fraction and a further fines fraction; subjecting said further fines fraction to another size separation in a brine slurry to provide a discardable finer fraction, and a second final finer fraction; and combining said final finer fractions, separately conditioning the combined final fractions of said potash ore; reagentizing said conditioned finer fraction; separately reagentizing said final coarser fraction of said potash ore; combining said separately conditioned finer and coarser fractions to provide a conditioned and reagentized feed for flotation; subjecting said conditioned and reagentized feed slurry of finer and coarser fractions of potash ore to a rougher flotation to provide a first non-float tails product and a first float concentrate product; subjecting said first float concentrate product to a cleaner flotation to provide a second cleaner float concentrate recovered product and a first non-float middlings product; combining said first non-float tails product with said first non-float middlings fraction; subjecting said combined fraction to a size separation to provide a first undersize fraction and a first oversize fraction; comminuting said first oversize fraction; subjecting said comminuted first oversize fraction to a regrind rougher flotation to provide a second non-float tails fraction and a second float concentrate fraction which is subjected to a regrind cleaner flotation to provide a recovered third concentrate float product and a second non-float middlings product; subjecting said second cleaner float concentrate product to a size classification step to provide a further finer fraction and a further coarser fraction; subjecting said further coarser fraction to a leaching step; combining said leached product with said further finer fraction; adding said combined fractions to said third concentrate float product; subjecting said added product to a first procedure to separate liquid suspension from solids; recovering the solid product; subjecting the effluent from said first liquid-solids separation procedure to a thickening step to provide a solids fraction and a liquid fraction; subjecting said solids fraction to a second procedure to separate liquids from solids; recovering the solids product; and recycling the liquid effluent in a closed cycle to said thickening step.

7. The process according to claim 6, including the steps of combining said first undersize fraction, said second tails non-float product and said second middlings non-float product to form a third flotation tails; subjecting said third flotation tails to at least one size separation step to provide a first underflow fraction and a first overflow fraction; subjecting said first underflow fraction to a first procedure to separate solids from liquids to provide a first solid fraction and a first liquid fraction; discarding said solid fraction; combining said first overflow fraction with said first liquid fraction; subjecting said first combined fractions to a thickening step to provide a first recovered brine fraction and a second solids fraction; subjecting said second solids fraction to a second procedure to separate solids from liquids to provide a third solids fraction and a third liquid fraction; and returning said third liquid fraction, in a closed loop system, to said thickening step.

8. In the process for recovering potash values from potash ore in which said ore is comminuted, slurried with brine, sized, reagentized and subjected to froth flotation to give a potash flotation concentrate, the improvement which comprises effecting a first size separation of said comminuted ore in a brine slurry to provide a first finer overflow fraction and a first coarse underflow fraction, subjecting the first coarse underflow in a brine slurry to a size separation in a siphonsizer to provide a final coarser fraction and a second finer fraction; combining said finer fractions; and subjecting said combined finer fractions in a brine slurry to a size separation to provide a discardable finer fraction and a recoverable coarse fraction, subjecting said coarse fraction in a brine slurry to a size separation to provide a first final fraction and a further fines fraction; subjecting said further fines fraction to another size separation in a brine slurry to provide a discardable finer fraction, and a second final finer fraction; combining said final finer fractions for reagentizing and froth flotation.

9. The process for recovering potash values from potash ore which comprises the steps: comminuting said ore; slurrying said ore with brine; wet classifying said ore to provide a first undersize fraction and a first oversize fraction; comminuting said first oversize fraction in a wet comminution step; wet classifying said comminuted first oversize fraction to provide a second undersize fraction and a second oversize fraction; combining said second undersize fraction with said first undersize fraction; and continuously returning said second oversize fraction to said wet comminution step in a closed loop cycle; whereby only undersize ore for flotation is recovered; effecting a first size separation of said undersize ore particles in a brine slurry to provide a first finer overflow fraction and a first coarse underflow fraction; subjecting the first coarse underflow fraction in a brine slurry to a size separation in a siphonsizer to provide a final coarser fraction and a second finer fraction; combining said finer fractions; and subjecting said combined finer fractions in a brine slurry to a size separation to provide a discardable finer fraction, and a recoverable coarse fraction; subjecting said recoverable coarse fraction to a size separation in a brine slurry to provide a first final finer fraction and a further fines fraction; subjecting said further fines fraction to another size separation in a brine slurry to provide a discardable finer fraction and a second final finer fraction; combining said first final finer fraction with said second final finer fraction; conditioning the combined final finer fractions with starch and reagentizing said conditioned combined final finer fractions; separately reagentizing said final coarser fraction and combining said reagentized final coarser fraction with said conditioned and reagentized combined final finer fractions; submitting the combined reagentized fractions to froth flotation, separating the potash concentrate from said froth flotation and removing water from said potash concentrate to give potash having a high $K_2O$ value.

References Cited

UNITED STATES PATENTS

| | | | |
|---|---|---|---|
| 2,596,407 | 5/1952 | Jackson | 241—20 |
| 2,836,297 | 5/1958 | Smith | 209—166 |
| 3,008,655 | 11/1961 | Adams | 209—12 X |
| 3,067,957 | 12/1962 | Erck | 241—24 X |
| 3,145,163 | 8/1964 | Dancy | 209—12 |
| 3,215,509 | 11/1965 | Adams | 209—12 X |

FRANK W. LUTTER, *Primary Examiner.*

U.S. Cl. X.R.

241—21, 24; 209—2, 12, 166, 10; 23—312